(12) United States Patent
Suzuki et al.

(10) Patent No.: US 12,100,865 B2
(45) Date of Patent: *Sep. 24, 2024

(54) TERMINAL FOR SECONDARY BATTERY AND SECONDARY BATTERY PROVIDED WITH THE TERMINAL

(71) Applicant: PRIME PLANET ENERGY & SOLUTIONS, INC., Tokyo (JP)

(72) Inventors: Kosuke Suzuki, Toyota (JP); Takahiro Sakurai, Nagoya (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 2 days.

This patent is subject to a terminal disclaimer.

(21) Appl. No.: 17/404,616

(22) Filed: Aug. 17, 2021

(65) Prior Publication Data
US 2022/0085469 A1    Mar. 17, 2022

(30) Foreign Application Priority Data

Sep. 17, 2020 (JP) ................................. 2020-155913

(51) Int. Cl.
*H01M 10/00* (2006.01)
*B23K 20/10* (2006.01)
(Continued)

(52) U.S. Cl.
CPC ........... *H01M 50/566* (2021.01); *B23K 20/10* (2013.01); *H01M 50/103* (2021.01);
(Continued)

(58) Field of Classification Search
CPC ..... H01M 50/543–567; H01M 50/566; H01M 50/103; H01M 50/209; H01M 50/502;
(Continued)

(56) References Cited

U.S. PATENT DOCUMENTS

2002/0061438 A1     5/2002  Inoue et al.
2003/0170535 A1*    9/2003  Watanabe ........... H01M 50/507
                                                           429/162
(Continued)

FOREIGN PATENT DOCUMENTS

CN          102544423 A     7/2012
CN          103227311 A     7/2013
(Continued)

OTHER PUBLICATIONS

Machine translation of WO-2015060175-A1, obtained from PE2E search on Jan. 24, 2023 (Year: 2015).*

(Continued)

*Primary Examiner* — Nicholas P D'Aniello
(74) *Attorney, Agent, or Firm* — Finnegan, Henderson, Farabow, Garrett, and Dunner, LLP (57) ABSTRACT

The technique disclosed herein provides a terminal that enables welding with an external member to be realized without requiring surface treatment of a metallic portion having been pressure-welded during ultrasonic welding. The terminal disclosed herein is a terminal constituting any of positive and negative electrodes of a secondary battery and includes a plate-like metallic first member and a metallic second member which is ultrasonically welded to one plate surface of the first member. A recessed portion is formed on a surface on an opposite side to the surface, to which the second member is welded, of the first member, and ultrasonic welding between the first member and the second member is realized in the recessed portion.

6 Claims, 5 Drawing Sheets

(51) Int. Cl.
*H01M 50/103* (2021.01)
*H01M 50/209* (2021.01)
*H01M 50/502* (2021.01)
*H01M 50/564* (2021.01)
*H01M 50/566* (2021.01)
*H01M 10/0525* (2010.01)

(52) U.S. Cl.
CPC ....... *H01M 50/209* (2021.01); *H01M 50/502* (2021.01); *H01M 50/564* (2021.01); *H01M 10/0525* (2013.01)

(58) Field of Classification Search
CPC .......... H01M 10/0525; H01M 50/507; H01M 50/512; H01M 50/522; H01M 50/553; H01M 50/564; H01M 50/562; H01M 50/552; H01M 50/557; B23K 20/10; B23K 2103/10; B23K 20/2333; B23K 2101/36; B23K 2103/12; Y02E 60/10
See application file for complete search history.

(56) References Cited

U.S. PATENT DOCUMENTS

| | | |
|---|---|---|
| 2005/0100785 A1 | 5/2005 | Enomoto et al. |
| 2011/0052970 A1 | 3/2011 | Kurata et al. |
| 2012/0148908 A1 | 6/2012 | Ito |
| 2012/0214030 A1 | 8/2012 | Guen |
| 2013/0196192 A1 | 8/2013 | Harada et al. |
| 2013/0224536 A1 | 8/2013 | Hattori et al. |
| 2014/0178746 A1 | 6/2014 | Ono |
| 2015/0086844 A1* | 3/2015 | Masuda .............. H01M 50/528 29/25.03 |
| 2015/0136839 A1* | 5/2015 | Kanryo ................. B23K 20/10 228/110.1 |
| 2015/0140391 A1 | 5/2015 | Sakate et al. |
| 2015/0183052 A1 | 7/2015 | Murakami et al. |
| 2015/0221926 A1 | 8/2015 | Yoshitake et al. |
| 2015/0243955 A1 | 8/2015 | Kang |
| 2015/0295221 A1 | 10/2015 | Urano et al. |
| 2015/0318519 A1 | 11/2015 | Tsutsumi et al. |
| 2016/0043353 A1 | 2/2016 | Tsutsumi et al. |
| 2016/0118641 A1 | 4/2016 | Oda et al. |
| 2016/0254517 A1 | 9/2016 | Tsunaki et al. |
| 2016/0372722 A1 | 12/2016 | Yoshida et al. |
| 2017/0229700 A1* | 8/2017 | Matsumoto ......... H01M 50/176 |
| 2018/0085847 A1 | 3/2018 | Sato |
| 2018/0207745 A1 | 7/2018 | Hori et al. |
| 2018/0294465 A1 | 10/2018 | Nagai et al. |
| 2018/0331348 A1 | 11/2018 | Kobayashi |
| 2019/0044107 A1 | 2/2019 | Ito |
| 2019/0054562 A1 | 2/2019 | Miyashiro et al. |
| 2019/0221791 A1 | 7/2019 | Wakimoto |
| 2019/0273240 A1 | 9/2019 | Hagino et al. |
| 2020/0035964 A1 | 1/2020 | Zhang et al. |
| 2020/0075923 A1 | 3/2020 | Takabayashi et al. |
| 2020/0091492 A1 | 3/2020 | Guen |
| 2020/0243868 A1 | 7/2020 | Takabayashi et al. |
| 2020/0358071 A1 | 11/2020 | Kawanishi |
| 2022/0085463 A1 | 3/2022 | Suzuki et al. |
| 2022/0085467 A1 | 3/2022 | Suzuki et al. |
| 2022/0085468 A1 | 3/2022 | Suzuki et al. |
| 2023/0015845 A1 | 1/2023 | Sakurai |
| 2023/0039284 A1 | 2/2023 | Sakurai et al. |

FOREIGN PATENT DOCUMENTS

| | | |
|---|---|---|
| CN | 105830253 A | 8/2016 |
| CN | 106575741 A | 4/2017 |
| CN | 107848064 A | 3/2018 |
| CN | 110048065 A | 7/2019 |
| CN | 209880722 U | 12/2019 |
| CN | 110875462 A | 3/2020 |
| CN | 111183536 A | 5/2020 |
| EP | 2490282 A1 | 8/2012 |
| EP | 3 062 370 A1 | 8/2016 |
| EP | 3179537 A1 | 6/2017 |
| EP | 3 467 906 A1 | 4/2019 |
| EP | 3972042 A1 | 3/2022 |
| JP | H 07-224944 A | 8/1995 |
| JP | 09-219204 A | 8/1997 |
| JP | 11-283588 A | 10/1999 |
| JP | 2000-082487 A | 3/2000 |
| JP | 2000-164195 A | 6/2000 |
| JP | 2001-126706 A | 5/2001 |
| JP | 2001-357834 A | 12/2001 |
| JP | 2004-220963 A | 8/2004 |
| JP | 2005-019213 A | 1/2005 |
| JP | 2009-087728 A | 4/2009 |
| JP | 2009-110808 A | 5/2009 |
| JP | 2011-124024 A | 6/2011 |
| JP | 2012-174452 A | 9/2012 |
| JP | 2012-190636 A | 10/2012 |
| JP | 2013-075297 A | 4/2013 |
| JP | 2013-93287 A | 5/2013 |
| JP | 2013-157156 A | 8/2013 |
| JP | 2014-127277 A | 7/2014 |
| JP | 2014-146498 A | 8/2014 |
| JP | 2014-526962 A | 10/2014 |
| JP | 2015-011785 A | 1/2015 |
| JP | 2015-030007 A | 2/2015 |
| JP | 2015-056273 A | 3/2015 |
| JP | 2015-059826 A | 3/2015 |
| JP | 2015-060730 A | 3/2015 |
| JP | 2015-099759 A | 5/2015 |
| JP | 2018-088464 A | 5/2015 |
| JP | 2015-153521 A | 8/2015 |
| JP | 2015-162460 A | 9/2015 |
| JP | 2016-018675 A | 2/2016 |
| JP | 2016-058215 A | 4/2016 |
| JP | 2016-85961 A | 5/2016 |
| JP | 2016-115458 A | 6/2016 |
| JP | 2016-129125 A | 7/2016 |
| JP | 2016-132131 A | 7/2016 |
| JP | 2016-192285 A | 11/2016 |
| JP | 2016-207510 A | 12/2016 |
| JP | 2017-027819 A | 2/2017 |
| JP | 6087413 B1 | 3/2017 |
| JP | 6216368 B2 | 10/2017 |
| JP | 2017-228418 A | 12/2017 |
| JP | 2018-181552 A | 11/2018 |
| JP | 2019-009045 A | 1/2019 |
| JP | 2020-102320 A | 7/2020 |
| JP | 2020-107473 A | 7/2020 |
| JP | 2020-119874 A | 8/2020 |
| KR | 10-2016-0107938 A | 9/2016 |
| KR | 20190124039 A * | 11/2019 | .............. H01M 4/64 |
| WO | WO 2012/118014 A1 | 9/2012 |
| WO | WO 2013/013083 A2 | 1/2013 |
| WO | WO 2014/042005 A1 | 3/2014 |
| WO | WO 2014/103874 A1 | 7/2014 |
| WO | WO-2015060175 A1 * | 4/2015 | .............. H01G 2/18 |
| WO | WO 2016/020996 A1 | 2/2016 |
| WO | WO 2017-141694 A1 | 8/2017 |

OTHER PUBLICATIONS

Machine translation of KR-20190124039-A, obtained from PE2E search on Jan. 24, 2023 (Year: 2019).*
Office Action issued in U.S. Appl. No. 17/409,990 on Aug. 30, 2022.
Notice of Allowance dated Mar. 8, 2023, U.S. Appl. No. 17/409,990.
Final Office Action dated Apr. 4, 2023, U.S. Appl. No. 17/404,355.
Philipp et al., "Joining of lithium-ion batteries using laser beam welding: Electrical losses of welded aluminum and copper joints," ICALEO 2012, 915-923, published Sep. 27, 2018.
Non-Final Office Action dated Feb. 16, 2023, U.S. Appl. No. 17/876,054.
Non-Final Office Action dated Feb. 22, 2023, U.S. Appl. No. 17/404,454.
Dhara, Sisir et al., "Impact of Ultrasonic Welding on Multi-Layered Al-Cu Joint for Electric Vehicle Battery Applications: A Layer-Wise (56) References Cited

OTHER PUBLICATIONS

Microstructural Analysis," Materials Science & Engineering A; pp. 1-18; 791 (Jun. 2020) 139795.
Office Action issued in U.S. Appl. No. 17/404,355 on Dec. 29, 2022.
Non Final Office Action dated Aug. 15, 2023, issued in U.S. Appl. No. 17/404,355.
Final Office Action dated Jun. 15, 2023, issued in U.S. Appl. No. 17/876,054.
Final Office Action dated Aug. 31, 2023, in U.S. Appl. No. 17/404,454.
Advisory Action Before the Filing of an Appeal Brief dated Oct. 12, 2023, in U.S. Appl. No. 17/876,054.
Office Action issued in U.S. Appl. No. 17/876,054 dated Jan. 11, 2024.
Final Office Action issued in U.S. Appl. No. 17/404,355 dated Jan. 31, 2024.
Zhang, Zhigiang et al., "Effects of Ultrasonic Assisted Friction Stir Welding on Flow Behavior, Microstructure and Mechanical Properties of 7N01-T4 Aluminum Alloy Joints," Journal of Materials Science & Technology, vol. 43 (2020), pp. 1-13.
"Mechanical Manufacturing Inspection Technique, Thermal Processing Section," pp. 487-488, Mar. 1988.
Office Action in CN 202111086085.6, dated Mar. 20, 2024.
Notice of Allowance and Notice of Allowability in U.S. Appl. No. 17/876,054, dated Apr. 15, 2024.
Office Action issued in U.S. Appl. No. 17/404,454 dated Mar. 13, 2024.
Zhixiang, C., "Welding Process of Ships," Harbin Institute of Technology Press, Mar. 31, 2015, pp. 149-150.
Office Action in CN 202111080245.6, dated Jun. 28, 2024.
"EAA Aluminum Automotive Manual-Joining," 8. Metal Joining, The Aluminum Automotive Manual, European Aluminium Association, 2015, pp. 1-66.
Final Office Action in U.S. Appl. No. 17/404,454, dated Jul. 19, 2024.

* cited by examiner

TERMINAL FOR SECONDARY BATTERY AND SECONDARY BATTERY PROVIDED WITH THE TERMINAL

CROSS-REFERENCE TO RELATED APPLICATIONS

The present application claims priority on the basis of Japanese Patent Application No. 2020-155913 filed in Japan on Sep. 17, 2020, the entire contents of which are incorporated herein by reference.

BACKGROUND OF THE DISCLOSURE

1. Technical Field

The present disclosure relates to a terminal of a secondary battery. Specifically, the present disclosure relates to a terminal which is arranged at a prescribed position in a secondary battery and which enables conduction from inside to outside of the cell, and to a secondary battery using the terminal.

2. Background

Secondary batteries such as lithium-ion secondary batteries are capable of producing high energy density despite being lightweight and are therefore widely used as portable power supplies of personal computers, portable terminals, and the like as well as vehicle-mounted power supplies of EVs (electrical vehicles), HVs (hybrid vehicles), PHVs (plug-in hybrid vehicles), and the like. In particular, since high output is required of a vehicle-mounted power supply, assembled batteries in which a plurality of secondary batteries (cells) are electrically connected to each other are preferably used.

Generally, an assembled battery is constructed by respectively electrically connecting positive electrode terminals and negative electrode terminals of a plurality of cells via busbars. However, when welding a busbar to the positive electrode terminal and the negative electrode terminal of a cell, if a metal that constitutes the busbar and a metal that constitutes the positive electrode terminal and the negative electrode terminal differ from each other, it is difficult to perform the welding in an appropriate manner due to differences in thermal conductivity and melting points. In addition, when water or the like comes into contact with a boundary between dissimilar metals, electricity is generated and corrosive deterioration of the metals may occur.

In consideration thereof, Japanese Patent Application Publication No. 2011-124024 discloses an assembled battery using a positive electrode terminal constituted by dissimilar metals so that a metal constituting a busbar and a metal constituting a busbar-welding portion of the positive electrode terminal are made identical to each other. The positive electrode terminal is made up of a base portion that is mainly constituted by aluminum and a positive electrode external terminal that is mainly constituted by copper, and the base portion and the positive electrode external terminal are joined to each other by ultrasonic joining and swaging. Accordingly, compatibility, when welding the busbar made of copper and the positive electrode external terminal mainly constituted by copper to each other, can be improved.

In addition, Japanese Patent Application Publication No. 2016-18675 discloses a secondary battery in which a metal member constituted by a same metal as a metal constituting a busbar is joined to an external terminal by ultrasonic joining.

SUMMARY

However, with the techniques described in both Japanese Patent Application Publication No. 2011-124024 and Japanese Patent Application Publication No. 2016-18675, irregularities are formed on a metal surface having been subjected to pressure welding for ultrasonic joining and, at the same time, burrs are created. Therefore, before welding an external member such as a busbar to the metal surface, surface treatment for smoothing the irregularities formed on the metal surface and a burr cleaning step have to be performed. The presence of such additional steps increases cost and manufacturing time of a secondary battery and is therefore undesirable.

The present disclosure has been made in consideration of the circumstances described above, and a main object thereof is to provide a terminal which constitutes any of positive and negative electrodes of a secondary battery and which enables welding with an external member such as a busbar to be performed without requiring surface treatment of a metal portion having been pressure-welded by ultrasonic welding. In addition, another object of the present disclosure is to provide a secondary battery and an assembled battery provided with the terminal.

A terminal disclosed herein is a terminal constituting any of positive and negative electrodes of a secondary battery and includes a plate-like metallic first member and a metallic second member which is ultrasonically welded to one plate surface of the first member. A recessed portion is formed on a surface on an opposite side to the surface, to which the second member is welded, of the first member, and ultrasonic welding between the first member and the second member is realized in the recessed portion.

According to such a configuration, even after joining the first member and the second member by ultrasonic welding, since burrs and irregularities of a metal surface which may occur due to the ultrasonic welding occur in the recessed portion, a terminal is provided which enables welding of an external member such as a busbar to be performed on a plate surface having a recessed portion of the first member without requiring surface treatment.

In addition, in a preferable aspect of the terminal disclosed herein, welding residue that is created, when performing the ultrasonic welding, is present in the recessed portion. According to such a configuration, a terminal is provided which enables welding of an external member such as a busbar to be performed in a state where welding residue created when performing the ultrasonic welding is present in the recessed portion.

Furthermore, in a preferable aspect of the terminal disclosed herein, the first member and the second member are constituted by metals that differ from each other. According to such a configuration, a terminal is provided which enables welding between the first member and an external member such as a busbar and joining between the second member and an internal terminal electrically connected to an electrode body to be preferably performed.

In addition, in a preferable aspect of the terminal disclosed herein, the first member is constituted by aluminum or an alloy having aluminum as a main component, and the second member is constituted by copper or an alloy having copper as a main component. According to such a configuration, a terminal is provided which enables joining between an external member such as a busbar that is constituted by aluminum or an alloy having aluminum as a main component and the first member and joining between a negative electrode internal terminal which is constituted by copper or an alloy having copper as a main component and which is electrically connected to a negative electrode and the second member to be preferably performed.

Furthermore, a secondary battery disclosed herein includes: an electrode body including a positive electrode and a negative electrode; a battery case housing therein the electrode body; and a positive electrode terminal and a negative electrode terminal electrically connected to the positive electrode and the negative electrode of the electrode body, respectively, wherein at least one of the positive electrode terminal and the negative electrode terminal is constituted by the terminal disclosed herein.

According to such a configuration, a secondary battery is provided which enables preferable joining between the positive and negative electrode terminals and an external member to be realized.

In addition, an assembled battery disclosed herein is constructed by aligning a plurality of cells that are electrically connected to each other, wherein the secondary battery disclosed herein is used as the plurality of cells.

According to such a configuration, an assembled battery is provided which enables an electrical connection between terminals and an external member such as a busbar to be preferably performed.

In addition, in a preferable aspect of the assembled battery disclosed herein, in the plurality of cells, a positive electrode terminal of a single cell and a negative electrode terminal of another single cell are respectively electrically connected by a predetermined busbar, the terminal disclosed herein is used as one terminal of the positive electrode terminal of the single cell and the negative electrode terminal of the other single cell, and the busbar is formed of a same metal as a metal that constitutes the first member of the terminal.

According to such a configuration, an assembled battery is provided which enables welding between the busbar and the positive and negative electrode terminals to be preferably realized.

Furthermore, in order to achieve the object described above, a method of manufacturing the terminal disclosed herein is provided. Specifically, a method of manufacturing a terminal constituting any of positive and negative electrodes of the secondary battery disclosed herein includes the steps of: preparing a plate-like metallic first member and a metallic second member; and joining the second member to one plate surface of the first member by ultrasonic welding, wherein a recessed portion is formed on a surface on an opposite side to the surface, to which the second member is welded, of the first member, and the ultrasonic welding is executed in the recessed portion.

According to a manufacturing method configured as described above, burrs that may be created by ultrasonic welding can be kept inside the recessed portion and a terminal that does not require surface treatment after the ultrasonic welding can be provided.

In addition, in a preferable aspect of the method of manufacturing a terminal disclosed herein, the first member and the second member are constituted by metals that differ from each other.

According to the manufacturing method configured as described above, a terminal can be manufactured which enables welding between the first member and an external member such as a busbar and welding between the second member and an internal terminal electrically connected to an electrode body to be preferably performed.

Furthermore, in a preferable aspect of the method of manufacturing a terminal disclosed herein, the first member is constituted by aluminum or an alloy having aluminum as a main component, and the second member is constituted by copper or an alloy having copper as a main component.

According to the manufacturing method configured as described above, a terminal can be manufactured which enables joining between an external member such as a busbar that is constituted by aluminum or an alloy having aluminum as a main component and the first member and joining between a negative electrode internal terminal which is constituted by copper or an alloy having copper as a main component and which is electrically connected to a negative electrode and the second member to be preferably performed.

DETAILED DESCRIPTION

Hereinafter, an outline of configuration examples of a secondary battery and an assembled battery provided with a terminal according to the present embodiment will be described with reference to the drawings. It should be noted that, in the following drawings, members and portions that produce the same effects will be described using the same reference characters. It should also be noted that dimensional relationships (a length, a width, a thickness, and the like) shown in the respective drawings do not reflect actual dimensional relationships. Matters required to carry out the present disclosure, with the exception of matters specifically mentioned in the present specification, may be understood to be design matters of a person with ordinary skill in the art based on the prior art in the relevant technical field.

In the drawings of the present specification, a reference character X denotes a width direction (of a battery), a reference character Y denotes a thickness direction, and a reference character Z denotes a height direction. However, it should be noted that such directions are directions determined for the sake of illustration and are not intended to limit modes of installation of batteries.

In the present specification, a "secondary battery" refers to repetitively chargeable/dischargeable power storage devices in general and encompasses so-called storage batteries (in other words, chemical batteries) such as a lithium-ion secondary battery, a nickel hydride battery, and a nickel-cadmium battery as well as capacitors (in other words, physical batteries) such as an electrical double layer capacitor. In addition, in the present specification, a "lithium-ion secondary battery" refers to a secondary battery using lithium ions as charge carriers in which charging and discharging are realized by the movement of charges accompanying lithium ions between a positive electrode and a negative electrode.

Secondary Battery

Figure 1:
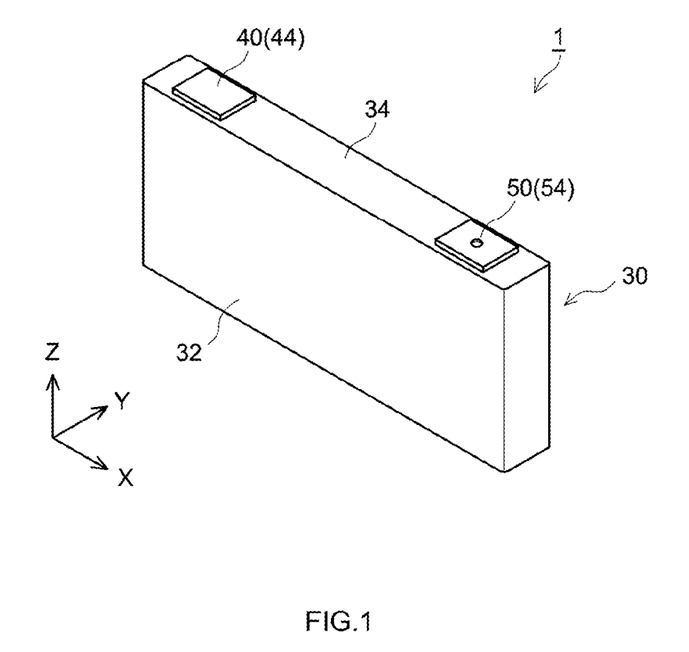
FIG. 1 is a perspective view schematically showing a secondary battery according to an embodiment.
Figure 3:
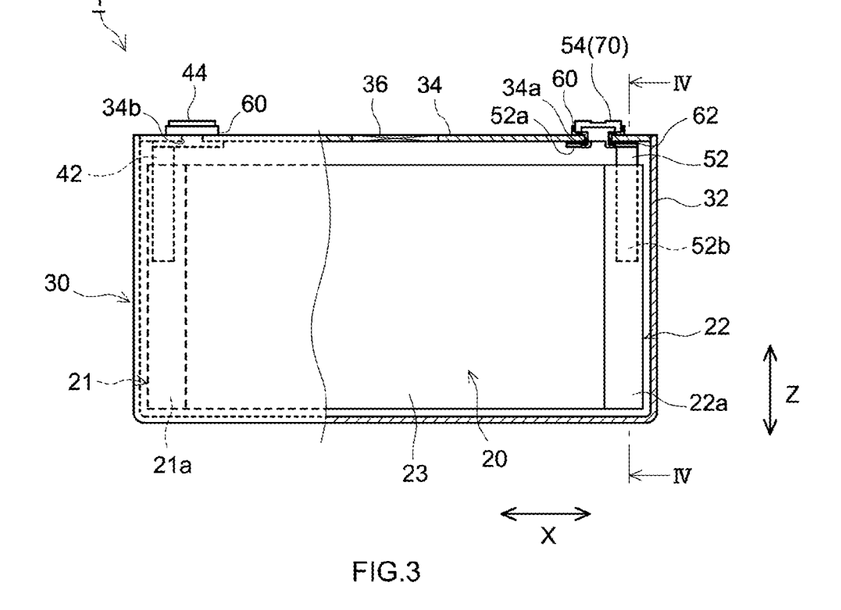
FIG. 3 is a partial breakaway view schematically showing a secondary battery according to an embodiment.

FIG. 1 is a perspective view schematically showing a secondary battery according to the present embodiment. In addition, FIG. 3 is a partial breakaway view schematically showing the secondary battery according to the embodiment. A secondary battery 1 according to the present embodiment includes an electrode body 20, an electrolyte (not illustrated), a battery case 30, a positive electrode terminal 40, a negative electrode terminal 50, a gasket 60, and an insulator 62. The positive electrode terminal 40 includes a positive electrode internal terminal 42 and a positive electrode external terminal 44, and the negative electrode terminal 50 includes a negative electrode internal terminal 52 and a negative electrode external terminal 54. In this case, the secondary battery 1 including a terminal 70 disclosed herein as the negative electrode external terminal 54 will be illustrated as the present embodiment. However, this is simply one example and other examples include the secondary battery 1 including the terminal 70 disclosed herein as the positive electrode external terminal 44. A configuration of the terminal 70 will be described later.

Figure 2:
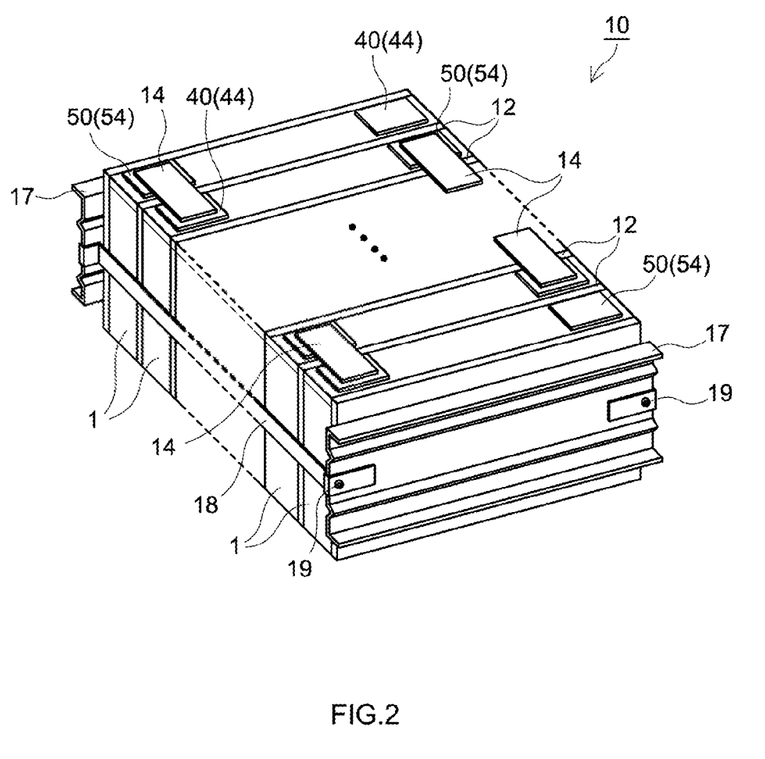
FIG. 2 is a perspective view schematically showing an assembled battery according to an embodiment.

FIG. 2 is a perspective view schematically showing an assembled battery according to the present embodiment. As shown in FIG. 2, the assembled battery 10 is constructed by aligning a plurality of secondary batteries (cells) 1 that are electrically connected to each other, wherein each cell is the secondary battery disclosed herein. Due to an alignment in which the cells 1 are inverted one by one, the positive electrode terminal 40 and the negative electrode terminal 50 are alternately arranged. A spacer 12 is inserted between the aligned cells 1. The spacer 12 is capable of functioning as heat radiating means for efficiently dissipating heat, length adjusting means, and the like. A pair of end plates (constraining plates) 17 is arranged at both ends of the aligned cells 1. A constraining beam member 18 is attached so as to bridge both end plates 17. Ends of the beam member 18 are fastened and fixed to the end plates 17 by screws 19. Accordingly, the plurality of cells 1 are constrained in an alignment direction of the cells 1 so that a constraint load is applied thereto.

The assembled battery 10 includes, between two cells 1 arranged adjacent to each other, a busbar 14 which connects an external member joining portion of the positive electrode external terminal 44 of a single cell 1 and an external member joining portion of the negative electrode external terminal 54 of another single cell 1 to each other. Accordingly, a conductive path from the positive electrode internal terminal 42 of the single cell 1 to the negative electrode internal terminal 52 of the other single cell 1 is formed via the busbar 14 and the external terminals and the respective cells 1 are electrically connected in series.

The busbar 14 is generally constituted by a metal with high conductivity of which examples include aluminum, copper, tin, nickel, and an alloy containing any of these metals as a main component. Ina preferable aspect, in the assembled battery 10, the terminal 70 configured as disclosed herein is used as either one terminal of the positive electrode terminal 40 (the positive electrode external terminal 44) of a single cell 1 and the negative electrode terminal 50 (the negative electrode external terminal 54) of another single cell 1 being connected by the busbar 14, and the busbar 14 is formed of a same metal as a metal that constitutes the first member 72 of the terminal 70. Due to the busbar 14 and the first member 72 being constituted by a same metal, welding can be strengthened and preferable conduction can be realized. In addition, preferably, the busbar 14, the external member joining portion of the positive electrode external terminal 44, and the external member joining portion of the negative electrode external terminal 54 are constituted by a same metal. For example, in a case where the positive electrode external terminal 44 of a single cell is constituted by aluminum, the negative electrode external terminal 54 of another single call is the terminal 70 structured as disclosed herein, and the first member 72 (refer to FIG. 5) of the terminal 70 is constituted by aluminum, the busbar 14 is preferably constituted by aluminum. According to this configuration, welding between the busbar 14 and the positive electrode external terminal 44 and the negative electrode external terminal 54 is strengthened and more preferable conduction is realized. It should be noted that the above merely represents a preferable specific example and is not intended to limit metals that constitute the external terminals of the positive electrode and the negative electrode and the busbar.

Hereinafter, respective elements that constitute the secondary battery 1 will be described.

Battery Case

The battery case 30 is a container which houses the electrode body 20. As shown in FIG. 1, the battery case 30 according to the present embodiment is a flat square container. However, the shape of the battery case 30 may be a box shape that is not a square (for example, a bottomed cylindrical box shape). The battery case 30 includes a square case main body 32 of which an upper surface is opened and a plate-shaped lid 34 which closes an opening portion of the case main body 32. As shown in FIG. 3, the lid 34 is provided with a safety valve 36 that releases internal pressure inside the battery case 30 when the internal pressure rises to or exceeds a prescribed level. In addition, the lid 34 is provided with a terminal insertion hole 34a that enables the negative electrode external terminal 54 to be inserted and a terminal insertion hole 34b that enables the positive electrode external terminal 44 to be inserted. As a material of the battery case 30, a metallic material with required strength is used and, for example, a lightweight metallic material with good thermal conductivity such as aluminum, stainless steel, or nickel-plated steel is used.

Electrode Body

The electrode body 20 is a power generation element housed inside the battery case 30 in a state of being covered by an insulating film (not illustrated) or the like. The electrode body 20 according to the present embodiment includes an elongated sheet-shaped positive electrode 21, an elongated sheet-shaped negative electrode 22, and an elongated sheet-shaped separator 23. The electrode body 20 is a wound electrode body in which the elongated sheet-shaped members described above are wound in layers. It should be noted that the structure of the electrode body is not particularly limited and various structures that may be adopted in a general sealed battery can be adopted. For example, the electrode body may be a laminated electrode body in which a positive electrode and a negative electrode with rectangular sheet shapes are laminated via a separator.

The positive electrode 21 includes a foil-shaped positive electrode current collector (for example, aluminum foil) and a positive electrode active material layer formed on a surface (preferably, both surfaces) of the positive electrode current collector. In addition, in one side edge portion (a left-side side edge portion in FIG. 3) of the positive electrode 21 in a width direction X, the positive electrode active material layer is not formed but a positive electrode connecting portion 21a is formed in which the positive electrode current collector is exposed. The positive electrode active material layer includes various materials such as a positive electrode active material, a binder, and a conductive material. Regarding the materials included in the positive electrode active material layer, materials that may be used in a conventional general secondary battery (for example, a lithium-ion secondary battery) can be used without any particular limitations, and since the materials included in the positive electrode active material layer do not limit the present disclosure, a detailed description thereof will be omitted.

The negative electrode 22 includes a foil-shaped negative electrode current collector (for example, copper foil) and a negative electrode active material layer formed on a surface (preferably, both surfaces) of the negative electrode current collector. In addition, in another side edge portion (a right-side side edge portion in FIG. 3) of the negative electrode 22 in the width direction X, the negative electrode active material layer is not formed but a negative electrode connecting portion 22a is formed in which the negative electrode current collector is exposed. In a similar manner to the positive electrode active material layer, the negative electrode active material layer also includes various materials such as a negative electrode active material, a binder, and the like. Regarding the materials included in the negative electrode active material layer, materials that may be used in a conventional general secondary battery can be similarly used without any particular limitations, and since the materials included in the negative electrode active material layer do not limit the present disclosure, a detailed description thereof will be omitted.

The separator 23 is interposed between the positive electrode 21 and the negative electrode 22 and prevents the electrodes from coming into direct contact with each other. Although not illustrated, micropores are formed in plurality in the separator 23, and a configuration is adopted in which lithium ions move between the positive electrode 21 and the negative electrode 22 through these micropores. While a resin sheet or the like having required heat resistance is used as the separator 23, since a separator that may be used in a conventional general secondary battery can be used as the separator 23 without any particular limitations, a detailed description thereof will be omitted.

As an electrolyte (not illustrated) housed in the battery case 30, electrolytes that may be used in a conventional general secondary battery can be used without any particular limitations and, for example, while the electrolyte may be a nonaqueous liquid electrolyte (a nonaqueous electrolytic solution) containing a nonaqueous solvent and a supporting salt, since the electrolyte does not limit the present disclosure, a detailed description thereof will be omitted.

Electrode Terminal

Figure 4:
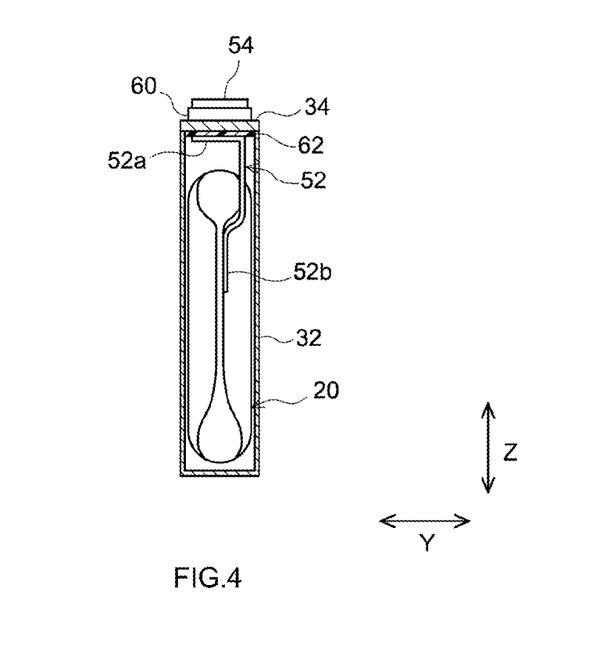
FIG. 4 is a sectional view taken along line IV-IV in FIG. 3.

The negative electrode terminal 50 includes a negative electrode-side current collector terminal (the negative electrode internal terminal 52) and a negative electrode-side external connection terminal (the negative electrode external terminal 54). The negative electrode internal terminal 52 is an elongated metal member that extends in the height direction Z. As shown in FIGS. 3 and 4, a lower end 52b of the negative electrode internal terminal 52 is joined and electrically connected to the negative electrode 22 (specifically, the negative electrode connecting portion 22a) inside the battery case 30. In addition, the negative electrode external terminal 54 is inserted into the terminal insertion hole 34a provided on the lid 34, a part of the negative electrode external terminal 54 is exposed outside of the battery case 30, and another part of the negative electrode external terminal 54 is electrically connected inside the battery case 30 to an upper end 52a of the negative electrode internal terminal 52. A through-hole for inserting the negative electrode external terminal 54 is provided in the upper end 52a and, by causing a swaging portion provided on the negative electrode external terminal 54 to protrude from the through-hole and then swaging the swaging portion, an electrical connection between the negative electrode internal terminal 52 and the negative electrode external terminal 54 is realized. The insulator 62 is arranged between the lid 34 and the negative electrode internal terminal 52 in order to prevent conduction between the battery case 30 (the lid 34) and the negative electrode internal terminal 52 and the negative electrode external terminal 54 and, further, the gasket 60 is arranged between the lid 34 and the negative electrode external terminal 54.

The positive electrode terminal 40 has a structure that is approximately the same as that of the negative electrode terminal 50 described above. In other words, the positive electrode terminal 40 includes a positive electrode-side current collector terminal (the positive electrode internal terminal 42) and a positive electrode-side external connection terminal (the positive electrode external terminal 44). The positive electrode internal terminal 42 is an elongated metal member that extends in the height direction Z. A lower end of the positive electrode internal terminal 42 is connected inside the battery case 30 to the positive electrode 21 (specifically, the positive electrode connecting portion 21a). In addition, the positive electrode external terminal 44 is inserted into the terminal insertion hole 34b provided on the lid 34, a part of the positive electrode external terminal 44 is exposed outside of the battery case 30, and another part of the positive electrode external terminal 44 is connected inside the battery case 30 to an upper end of the positive electrode internal terminal 42. A through-hole for inserting the positive electrode external terminal 44 is provided in the upper end and, by causing a swaging portion provided on the positive electrode external terminal 44 to protrude from the through-hole and then swaging the swaging portion, a connection between the positive electrode internal terminal 42 and the positive electrode external terminal 44 is realized. In addition, in the positive electrode terminal 40 according to the present embodiment, the insulator 62 is arranged between the lid 34 and the positive electrode internal terminal 42 in order to prevent conduction between the battery case 30 (the lid 34) and the positive electrode internal terminal 42 and the positive electrode external terminal 44 and, further, the gasket 60 is arranged between the lid 34 and the positive electrode external terminal 44.

Gasket

Figure 7:
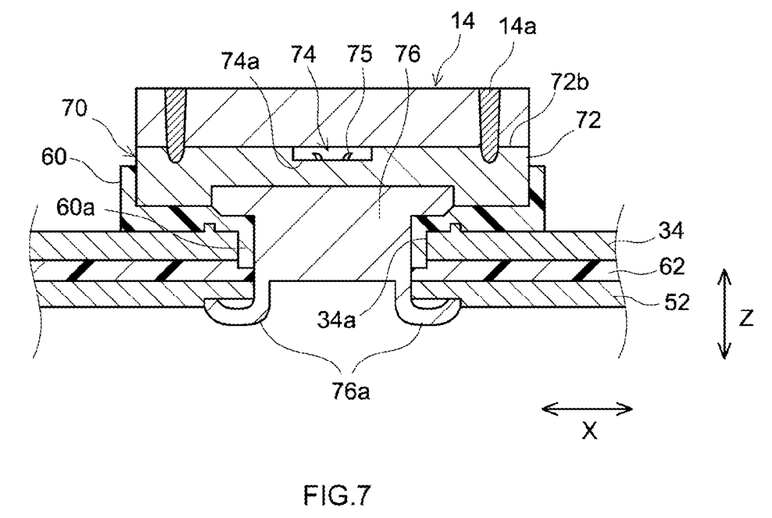
FIG. 7 is a sectional view schematically showing a connecting portion of a terminal provided in a secondary battery constituting an assembled battery according to an embodiment.

The gasket 60 is arranged between the lid 34 and the positive electrode external terminal 44 and between the lid 34 and the negative electrode external terminal 54 outside the battery case 30 and in the terminal insertion holes 34a and 34b provided on the lid 34. Accordingly, the gasket 60 insulates the lid 34 from the positive electrode external terminal 44 and the negative electrode external terminal 54. The gasket 60 has a through-hole into which the external terminals are to be inserted, in addition, as shown in FIG. 7, the gasket 60 has a hollow cylindrical portion 60a provided along a peripheral edge of the through-hole and a part of the external terminals is inserted into the cylindrical portion 60a. Accordingly, inner circumferential surfaces of the terminal insertion holes 34a and 34b provided on the lid 34 and the external terminals are prevented from coming into direct contact with each other. In addition, due to the swaging portion of the positive electrode external terminal 44 or the negative electrode external terminal 54 being swaged, the gasket 60 is compressed in the height direction Z between an outer surface of the lid 34 and the positive electrode external terminal 44 or the negative electrode external terminal 54. Accordingly, a space between the outer surface of the lid 34 and the positive electrode external terminal 44 or the negative electrode external terminal 54 can be sealed and leakage of a liquid or the like from inside the battery case 30 can be prevented and, at the same time, penetration of water or the like from outside the battery case 30 can be prevented.

The gasket 60 is formed of an insulative material capable of elastic deformation and, for example, a fluorine-based resin such as perfluoroalkoxy alkane resin (PFA), polyphenylene sulfide resin (PPS), aliphatic polyamide, or the like is used.

Insulator

The insulator 62 is arranged between the lid 34 and the positive electrode internal terminal 42 and between the lid 34 and the negative electrode internal terminal 52 inside the battery case 30 and insulates the lid 34 and the internal terminals from each other. The insulator 62 has a through-hole into which the positive electrode external terminal 44 or the negative electrode external terminal 54 is to be inserted, and a part of the external terminal is inserted into the through-hole. Due to the swaging portion of the positive electrode external terminal 44 or the negative electrode external terminal 54 being swaged, the insulator 62 is compressed in the height direction Z between the outer surface of the lid 34 and the positive electrode external terminal 44 or the negative electrode external terminal 54 to be fixed.

The insulator 62 is formed of an insulative material capable of elastic deformation and, for example, polyphenylene sulfide resin (PPS) or aliphatic polyamide is used.

Terminal

Figure 5:
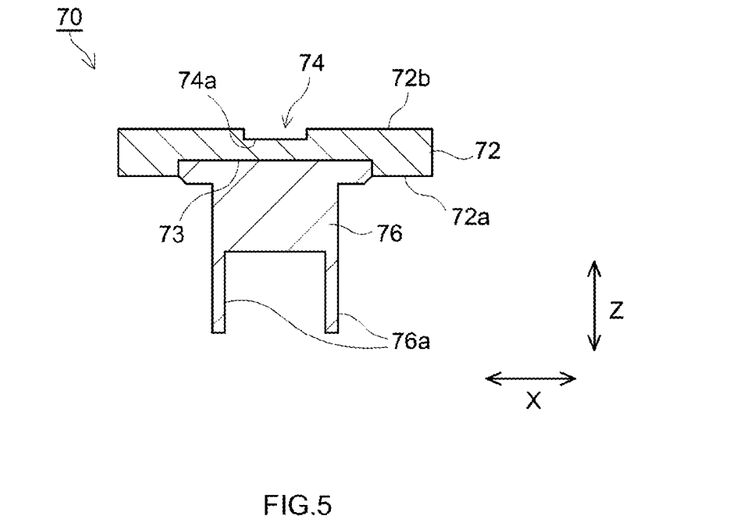
FIG. 5 is a sectional view schematically showing a structure of a terminal according to an embodiment.

In the secondary battery 1 according to the present embodiment, the terminal 70 structured as disclosed herein is adopted as at least one of the positive electrode external terminal 44 and the negative electrode external terminal 54. As shown in FIG. 5, the terminal 70 is provided with the first member 72 and a second member 76. When the terminal 70 is provided in the secondary battery 1, at least a part of the first member 72 is arranged outside of the battery case 30 and at least a part of the second member 76 is arranged inside the battery case 30.

The first member 72 is formed in a plate shape. One plate surface 72a of the first member 72 is ultrasonically welded to the second member 76, and a recessed portion 74 is formed on another plate surface 72b. In addition, the ultrasonic welding between the first member 72 and the second member 76 is realized in the recessed portion 74.

The one plate surface 72a of the first member 72 may be provided with a dent 73 to be fitted to a part of the second member 76. As shown in FIG. 5, by fitting the dent 73 and a part of the second member 76 to each other, positioning of the first member 72 and the second member 76 when performing ultrasonic welding can be more readily performed and a strong joint due to fitting can be realized.

The recessed portion 74 is provided in order to perform ultrasonic welding between the first member 72 and the second member 76. Performing ultrasonic welding on a bottom surface 74a of the recessed portion 74 enables welding residue (burrs) that may be created by the ultrasonic welding to be kept within the recessed portion 74. In addition, irregularities of a metal surface created by the ultrasonic welding are formed on the bottom surface 74a of the recessed portion 74. In other words, even after performing ultrasonic welding between the first member 72 and the second member 76, burrs 75 and irregularities due to the ultrasonic welding can be prevented from forming on the other plate surface 72b excluding the recessed portion 74. Therefore, welding of the other plate surface 72b to an external member (for example, the busbar 14) can be performed without having to perform surface treatment (for example, cleaning treatment) after the ultrasonic welding.

In a preferable aspect, when welding an external member to the other plate surface 72b, the recessed portion 74 is sealed by the external member. For example, as shown in FIG. 7, the busbar 14 and the first member 72 can be welded to each other by arranging the busbar 14 so as to seal the recessed portion 74. Accordingly, welding residue (the burrs 75) which may be created by ultrasonic welding can be confined to the recessed portion 74. In other words, an external member such as a busbar can be joined to the terminal 70 after the ultrasonic welding without performing cleaning of the burrs 75 that may be created in the recessed portion 74.

While a shape of the recessed portion 74 is not particularly limited and examples thereof may include shapes in which the other plate surface 72b is notched in a cuboid shape, a hemispherical shape, a circular cylindrical shape, a triangular pyramidal shape, a rectangular cylindrical shape, or the like, a cross section of the recessed portion 74 in a perpendicular direction with respect to the other plate surface 72b is preferably a rectangular shape. In other words, the cross section can assume a rectangular shape when adopting a shape in which the other plate surface 72b is notched in a cuboid shape, a circular cylindrical shape, rectangular cylindrical shape, or the like. Accordingly, on the bottom surface 74a of the recessed portion, ultrasonic welding between the first member 72 and the second member 76 can be readily performed and a strongly welded terminal 70 can be provided.

The number of the recessed portions 74 formed is not particularly limited as long as the recessed portions 74 can be sealed by the external member, and one or two or more recessed portions 74 can be formed. Forming the recessed portion 74 in plurality enables locations for performing ultrasonic welding to be increased and a joining performance due to the ultrasonic welding can be improved.

In addition, the size of the recessed portions 74 formed is not particularly limited as long as the recessed portions 74 can be sealed by the external member.

The second member 76 is provided with a swaging portion 76a as shown in FIG. 5, and by swaging the swaging portion 76a, the terminal 70 and the positive electrode internal terminal 42 or the negative electrode internal terminal 52 can be electrically connected to each other. Specifically, as shown in FIG. 7, after inserting the second member 76 that constitutes the terminal 70 into the cylindrical portion 60a of the gasket 60, the terminal insertion hole 34a of the lid 34, the through-hole of the insulator 62, the through-hole at the upper end of the internal terminal (in this case, the negative electrode internal terminal 52) in this order and causing the swaging portion 76a to protrude from the upper end of the internal terminal, by swaging the swaging portion 76a so that a compressive force is applied in the height direction Z, the gasket 60, the lid 34, the insulator 62, and the internal terminal can be pressure-bonded and fixed to each other.

A part of the second member 76 may have a shape that can be fitted to the dent 73 provided on the first member 72. Although not particularly limited, for example, as shown in FIG. 5, the second member 76 may be provided with a flange portion having a shape that can be fitted to the dent 73 provided on the first member 72. The flange portion is shaped so as to spread outward from a shaft portion of the second member 76. Accordingly, when performing ultrasonic welding, positioning of the first member 72 and the second member 76 can be readily performed. In addition, since joining due to fitting is performed in addition to the joining due to ultrasonic welding, a joining performance between the first member 72 and the second member 76 can be improved.

The first member 72 and the second member 76 are both constituted by a highly conductive metal of which examples include aluminum, an alloy of which aluminum is a main component, copper, and an alloy of which copper is a main component. While the first member 72 and the second member 76 may be constituted by either similar metals or dissimilar metals, preferably, the first member 72 and the second member 76 are constituted by metals that differ from each other. Specifically, a type of a metal constituting the second member 76 and a type of a metal constituting the internal terminal (the positive electrode internal terminal 42 or the negative electrode internal terminal 52) that may be electrically connected to the second member 76 can be made the same and, at the same time, a type of a metal constituting the first member 72 and a type of a metal constituting the external member (for example, the busbar 14) that may be electrically connected to the first member 72 can be made the same. Therefore, welding reliability between the first member 72 and the external member is improved and, at the same time, preferable conductivity and joining performance between the second member 76 and the internal terminal are realized.

It should be noted that, in the present specification, "an alloy of which aluminum is a main component" refers to an alloy of which at least 70% is made of aluminum. While other constituent elements contained in the alloy are not particularly limited, the alloy may include silicon, iron, copper, manganese, magnesium, zinc, chromium, titanium, lead, or zirconium.

In addition, in the present specification, "an alloy of which copper is a main component" refers to an alloy of which at least 50% is made of copper. While other constituent elements contained in the alloy are not particularly limited, the alloy may include silicon, iron, manganese, magnesium, zinc, chromium, titanium, lead, tin, phosphorus, aluminum, nickel, cobalt, beryllium, or zirconium.

Among the terminal 70 in which the first member 72 and the second member 76 are constituted by different metals, particularly preferably, the first member 72 is constituted by aluminum or an alloy having aluminum as a main component and the second member 76 is constituted by copper or an alloy having copper as a main component. The terminal 70 configured in this manner can be preferably used as the negative electrode external terminal 54. Typically, the negative electrode current collector is constituted by a copper foil, and since the negative electrode internal terminal 52 is preferably constituted by a same metal as the negative electrode current collector, the negative electrode internal terminal 52 is constituted by copper. Therefore, according to the terminal 70 configured as described above, a preferable connection between the second member 76 and the negative electrode internal terminal 52 can be achieved. In addition, as a typical example, the positive electrode current collector, the positive electrode internal terminal 42, and the positive electrode external terminal 44 are constituted by aluminum or an alloy having aluminum as a main component. Therefore, according to the terminal 70 configured as described above, since the first member 72 is constituted by aluminum or an alloy having aluminum as a main component, an external member constituted by a similar metal to the positive electrode external terminal 44 and the negative electrode external terminal 54 can be joined in a more preferable manner.

In the first member 72 and the second member 76, one plate surface 72a of the first member 72 and a part of the second member 76 are joined by ultrasonic welding and a pressure-welding portion of the ultrasonic welding is the recessed portion 74. In a preferable aspect, welding residue that is created when performing the ultrasonic welding is present in the recessed portion 74. Accordingly, an external member such as a busbar can be welded to the other plate surface 72b of the first member 72 without performing surface treatment after the ultrasonic welding. In addition, the fact that the ultrasonic welding has been performed in the recessed portion 74 can be visually confirmed.

Hereinafter, a manufacturing method of the terminal 70 will be described. The manufacturing method of the terminal 70 includes: preparing a plate-like metallic first member 72 and a metallic second member 76; and joining the second member 76 to one plate surface 72a of the first member 72 by ultrasonic welding.

In the manufacturing method, first, the plate-like metallic first member 72 and the metallic second member 76 that constitute the terminal 70 are prepared. A recessed portion 74 is formed on a plate surface (another plate surface 72b) on an opposite side to the surface of the first member 72 to which the second member 76 is welded.

In a preferable aspect, the first member 72 and the second member 76 prepared in the manufacturing method are constituted by metals that differ from each other. Accordingly, the first member 72 and an external member such as a busbar to be joined to the first member 72 can be constituted by similar metals and weldability can be improved. Furthermore, since the second member 76 and an internal terminal to be joined to the second member 76 can be constituted by similar metals, a preferable connection can be realized.

Particularly preferably, the first member 72 prepared in the manufacturing method is constituted by aluminum or an alloy having aluminum as a main component and the second member 76 prepared in the manufacturing method is constituted by copper or an alloy having copper as a main component. Using the terminal 70 manufactured with the members described above as the negative electrode terminal 50 (negative electrode external terminal 54) enables conduction on a negative electrode side to be improved and enables weldability with an external member such as a busbar made of aluminum to be improved.

Figure 6:
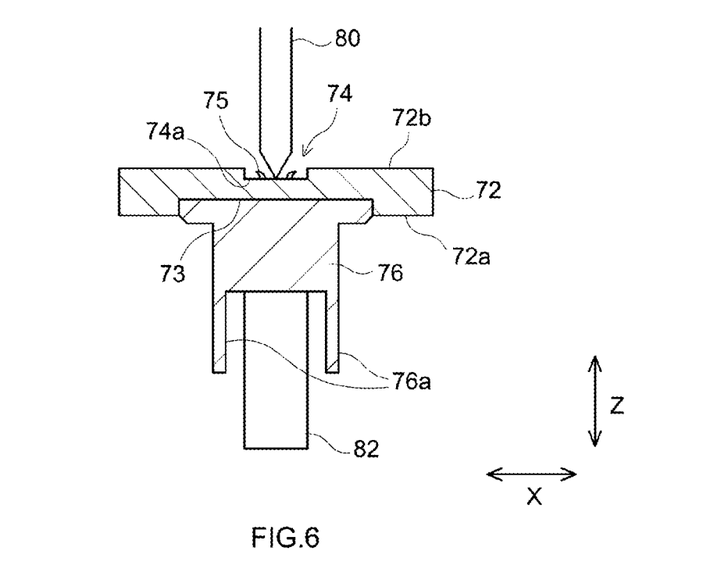
FIG. 6 is a sectional view schematically showing an ultrasonic welding method of a terminal according to an embodiment.

Next, the second member 76 is joined to the one plate surface 72a of the first member 72 by ultrasonic welding. The ultrasonic welding is executed in the recessed portion 74 to join the first member 72 and the second member 76 to each other. Specifically, as shown in FIG. 6, a horn 80 is brought into contact with a bottom surface 74a of the recessed portion 74 and an anvil 82 is brought into contact with the second member 76 so as to sandwich the first member 72 and the second member 76 in the height direction Z. The horn 80 is attached to a press machine (not illustrated) provided with a vibration generator. The vibration generator is an apparatus that applies a necessary vibration required by ultrasonic welding to the horn 80. In addition, a shape of a pressure-welding portion of the horn 80 is not particularly limited as long as the pressure-welding portion is small enough to fit into the recessed portion 74.

Although not particularly limited, in a preferable example of an arrangement position of the anvil 82, the anvil 82 is arranged inside a hollow structure of a swaging portion 76a of the second member 76 as shown in FIG. 6. Accordingly, positioning of the anvil 82 can be readily performed.

After arranging the horn 80 and the anvil 82, pressure is applied to the first member 72 and the second member 76 using the press machine. In addition, an ultrasonic vibration is applied to the horn 80 in a state where the pressure is being applied. While conditions of the pressure applied by the press machine and the ultrasonic vibration applied to the horn may be appropriately set in accordance with metallic species that constitute the first member 72 and the second member 76, dimensions of the first member 72 and the second member 76, a shape of the horn 80, and the like, for example, the pressure is applied within a range of 80 to 1600 N, the ultrasonic vibration is set to an amplitude of 20 to 80 µm and a frequency of 15 to 150 kHz, and energy of the horn 80 with respect to the pressure-welding portion is set to 30 to 500 J. Accordingly, ultrasonic welding in the recessed portion 74 can be realized and the terminal 70 with a structure disclosed herein can be fabricated.

While burrs 75 and metal surface irregularities may be created by the ultrasonic welding, according to this manufacturing method, welding residue (typically, the burrs 75) that may be created by the ultrasonic welding and irregularities that may be created on a surface to which the horn 80 is pressure-welded can be kept within the recessed portion 74. Therefore, the terminal 70 manufactured according to this manufacturing method enables an external member such as a busbar to be welded to the plate surface (the other plate surface 72b) on an opposite side to the surface of the first member 72 to which the second member 76 is welded without performing surface treatment after the ultrasonic welding.

In the terminal 70 manufactured according to this manufacturing method, while the burrs 75 may be formed in the recessed portion 74 as described above, by sealing the recessed portion 74 with the external member, a secondary battery 1 and an assembled battery 10 provided with the terminal 70 can be manufactured without having to perform a step of cleaning the burrs 75. As shown in FIG. 7, the terminal 70 can be installed in the secondary battery 1 (the lid 34) by inserting the second member 76 that constitutes the terminal 70 into the cylindrical portion 60a of the gasket 60, the terminal insertion hole 34a of the lid 34, the through-hole of the insulator 62, and the through-hole at the upper end of the internal terminal (in this case, the negative electrode internal terminal 52) in this order and causing the swaging portion 76a to protrude from the upper end of the internal terminal, and subsequently swaging the swaging portion 76a so that a compressive force is applied in the height direction Z in order to pressure-bond and fix the gasket 60, the lid 34, the insulator 62, and the negative electrode internal terminal 52 to each other. In addition, on the plate surface (the other plate surface 72b) having the recessed portion 74 of the first member 72, the busbar 14 (the external member) is arranged so as to seal the recessed portion 74 and the busbar 14 and the first member 72 are welded to each other. Providing a busbar welding portion 14a in a periphery of the recessed portion 74 enables the burrs 75 to be sealed in the recessed portion 74. Accordingly, the external member (for example, busbar) and the terminal 70 can be welded to each other without performing surface treatment after ultrasonic welding.

While specific examples of the present disclosure have been described in detail, such specific examples are merely illustrative and are not intended to limit the scope of claims. It is to be understood that the technique disclosed herein includes various alterations and modifications of the specific examples described above.

What is claimed is:

1. A secondary battery, comprising:
   an electrode body including a positive electrode and a negative electrode;
   a battery case housing therein the electrode body; and
   a positive electrode terminal and a negative electrode terminal electrically connected to the positive electrode and the negative electrode of the electrode body, respectively, wherein
   at least one of the positive electrode terminal and the negative electrode terminal, comprising:
   a plate-like metallic first member, and
   a metallic second member ultrasonically welded to a first surface on a first side of the first member, wherein
   a recessed portion is formed on a second surface of the first member on a second side of the first member opposite from the first surface,
   ultrasonic welding between the first member and the second member is realized in the recessed portion, and
   burrs created by the ultrasonic welding are disposed and scattered on a surface of the recessed portion and are confined to the recessed portion of the second surface, wherein
   at least a part of the first member is arranged outside of the battery case, and
   at least a part of the second member is arranged inside of the battery case.

2. The secondary battery according to claim 1, wherein the first member and the second member are constituted by metals that differ from each other.

3. The secondary battery according to claim 2, wherein the first member is constituted by aluminum or an alloy having aluminum as a main component, and the second member is constituted by copper or an alloy having copper as a main component.

4. A method of manufacturing a secondary battery according to claim 1, the secondary battery comprising a terminal constituting any of positive and negative electrodes of the secondary battery, the method comprising the steps of:
   preparing the plate-like metallic first member and the metallic second member; and
   joining the second member to the first surface of the first member on the first side of the first member by ultrasonic welding, wherein
   the recessed portion is formed on the second surface on the opposite side of the first member to the first surface, and
   ultrasonic welding the second member to the first member is executed in the recessed portion, wherein the burrs created by the ultrasonic welding are disposed and scattered on the surface of the recessed portion and are confined to the recessed portion of the second surface.

5. The method of manufacturing a terminal according to claim 4, wherein the first member and the second member are constituted by metals that differ from each other.

6. The method of manufacturing a terminal according to claim 5, wherein the first member is constituted by aluminum or an alloy having aluminum as a main component, and the second member is constituted by copper or an alloy having copper as a main component.

* * * * *